March 19, 1968  F. JAKOB  3,373,671
CAMERA FOR DAYLIGHT AND FLASH PHOTOGRAPHY
Filed July 19, 1965
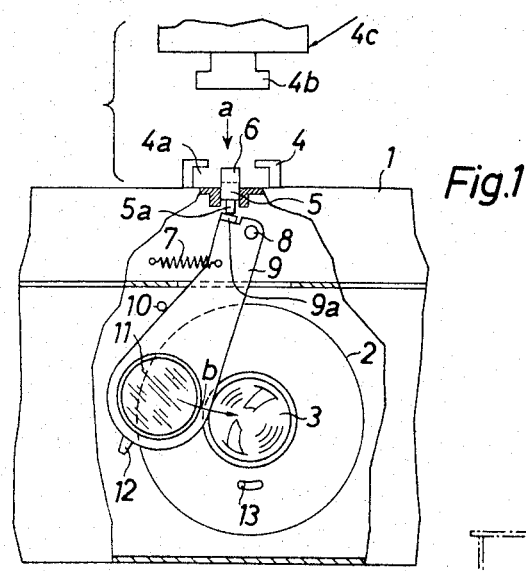
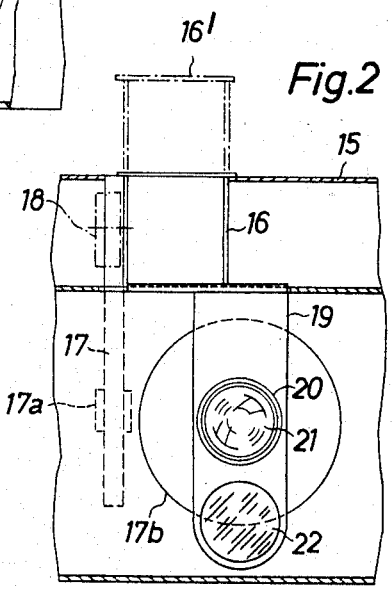
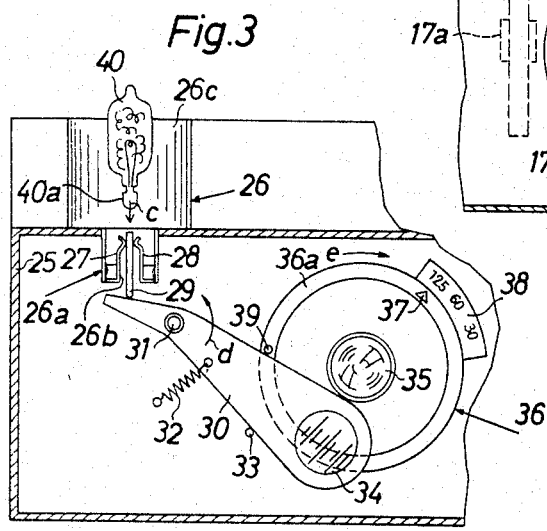
INVENTOR.
FRANZ JAKOB
BY
Michael J. Striker
Atty

United States Patent Office 3,373,671
Patented Mar. 19, 1968

3,373,671
CAMERA FOR DAYLIGHT AND
FLASH PHOTOGRAPHY
Franz Jakob, Unterhaching, Germany, assignor to Agfa-Gevaert Aktiengesellschaft, Leverkusen, Germany
Filed July 19, 1965, Ser. No. 473,006
Claims priority, application Germany, July 18, 1964,
A 46,626
17 Claims. (Cl. 95—11)

ABSTRACT OF THE DISCLOSURE

A camera having an objective with a stationary lens component of fixed focal length for daylight photography and a second lens component which moves into registry with the first component to reduce the focal length of the objective for photography in artificial light. The second component is moved into registry with the first component in response to attachment of an illuminating arrangement to the housing of the camera, in response to movement of a built-in reflector into operative position, or in response to insertion of a flash bulb into the socket of a built-in illuminating arrangement.

---

The present invention relates to photographic cameras in general, and more particularly to an improved camera for daylight and flashlight photography. Still more particularly, the invention relates to improvements in cameras of the type wherein the focal length of the objective must be varied when the camera is set for daylight or flashlight photography.

In many presently known cameras, the focal length of the objective is satisfactory for daylight photography but not for flash photography. For example, many cameras are equipped with an objective of such focal length that the camera will take sharp pictures of subjects or scenes which are located at a distance of several meters from the operation. On the other hand, amateur photographers normaly take pictures with flash illumination when the subject or scene is rather close, for example in the range of between one meter and four meters. Thus, and particularly if the objective is very close to the subject or scene, for example, at a distance of one meter or so, the pictures will be blurred because a camera embodying such an objective is simply unable to make a satisfactory exposure with flash illumination at close range.

Accordingly, it is an important object of my invention to provide a camera for daylight and flash photography wherein the objective is constructed and assembled in such a way that its focal length changes automatically when the user sets the camera for flash operation.

Another object of the invention is to provide a camera of the just outlined characteristics wherein the focal length of the objective changes again in a fully automatic way when the user sets the camera for operation in daylight.

A further object of the invention is to provide a camera for daylight and flash photography wherein the exposure time or another exposure value is automatically changed to an optimum value in response to appropriate change in the focal length of the objective.

An additional object of the invention is to provide a camera for daylight and flash photography which is provided with a built-in flash unit and wherein the placing of such flash unit into operative condition automatically brings about an optimum change in the focal length of the objective.

Still another object of the invention is to provide a camera for daylight and flash photography which may be combined with or detached from a separate flash unit and wherein proper connection of such separate flash unit to the camera housing brings about an automatic change in the focal length of the objective.

A concomitant objective of the invention is to provide a novel operative connection between a movable member of a built-in or separate flash unit and an objective of variable focal length which may be utilized in a camera of the above outlined characteristics.

A further object of the invention is to provide a camera for daylight and flash photography which embodies the above outlined features and advantages and wherein the provision of an objective of variable focal length adds very little, if anything, to the overall dimensions of the housing.

Another object of the invention is to provide a photographic camera wherein the user need not perform any additional operations due to the fact that at least one exposure value and the focal length must be changed when the camera is set for daylight or flash photography.

Briefly stated, one feature of my present invention resides in the provision of a camera which may be used for daylight or flash photography. The camera comprises a housing, a composite objective comprising a plurality of lens components including a first component of fixed focal length and a second component movable between first and second positions into and out of registry with the first component to thereby change the focal length of the objective in such a way that the camera is set for operation with artificial illumination of the subject when the two components register with each other, an illuminating arrangement including a member movable with reference to the housing between operative and inoperative positions, and motion transmitting means for automatically moving the second component into registry with the first component in response to movemet of such member to operative position.

The movable member of the illuminating arrangement which can constitute a flash unit may comprise a foot forming part of a separate flash unit and adapted to be received in the space defined by a customary shoe on the housing. It is also possible to use a camera with a built-in flash unit which comprises a reflector reciprocable between operative and inoperative positions. In such cameras, the motion transmitting means simply comprises a slide-like carrier which reciprocates with the reflector and automatically moves the second lens component into registry with the first lens component when the reflector is caused or allowed to assume its operative position. If the flash unit comprises a socket for a removable flash bulb, the motion transmitting means may comprise a lever which is rockably mounted in the housing and supports the second lens component, and a reciprocable pin which normally extends into the space allotted for the stem of the flash bulb and is expelled from such space in response to insertion of a bulb to thereby rock the lever to a position corresponding to the first position of the second lens component.

The motion transmitting means may also comprise a member which automaticaly adjusts the shutter mechanism to provide an exposure time which is best suited for flash operation when the second lens component is caused to register with the first lens component.

The novel features which are considered as characteristic of the invention are set forth in particular in the appended claims. The improved camera itself, however, both as to its construction and the mode of manipulating the same, together with additional features and advantages thereof, will be best understood upon perusal of the following detailed description of certain specific embodiments with reference to the accompanying drawings, in which:

FIG. 1 is a fragmentary diagrammatic front elevational view of a still camera which is constructed and assembled in accordance with a first embodiment of my invention and wherein the second lens component of the objective is movable into registry with the first lens component in response to attachment of a separate flash unit;

FIG. 2 is a similar fragmentary diagrammatic front elevational view of a second still camera wherein the second lens component moves into or out of registry with the first lens component in response to reciprocatory movement of a reflector which forms part of a built-in flash unit; and FIG. 3 is a fragmentary vertical section through a third still camera wherein the second lens component of the objective moves into registry with the first lens component in response to insertion of a flash bulb.

Referring to the drawings, and first to FIG. 1, there is shown a still camera which comprises a housing 1 supporting an adjustable shutter mechanism 2 and an objective of variable focal length. This objective comprises a first lens component 3 of fixed focal length and a second lens component 11 which is movable between first and second positions, namely, into and out of registry with the first component 3. FIG. 1 shows the component 11 in its second position in which it is laterally spaced from the optical axis so that it does not register with the first component 3. The camera is set for operation in daylight because the focal length of the component 3 is selected in such a way that the camera will make satisfactory exposures of subjects or scenes which are beyond a minimum distance from the objective. On the other hand, when the component 11 moves in front of and into registry with the stationary component 3, the focal length of the objective is reduced so that an amateur can make satisfactory exposures with flashlight and at a close range.

The top wall of the housing 1 supports a customary attachment, here shown as a shoe 4 which defines a space 4a adapted to accommodate the foot 4b of a separate flash unit 4c. The foot 4b is removable or insertable in directions at right angles to the plane of FIG. 1, and the space 4a accommodates the wedge-shaped head 6 of a reciprocable pin 5 which forms part of a motion transmitting mechanism serving to move the lens component 11 into registry with the stationary component 3 when the foot 4b is properly inserted into the space 4a. In response to such insertion, the foot 4b will slide along the inclined top face of the head 6 on the pin 5 and will cause the pin to move downwardly as indicated by an arrow a. The tip 5a at the lower end of the pin 5 bears against a small platform or lug 9a provided on the upper portion of a lever 9 which supports the lens component 11 and is rockable about a pivot 8 secured to the housing 1. The lever 9 is biased by a resilient element here shown as a helical spring 7 which tends to maintain the lever in abutment with a fixed stop 10 whereby the lens component 11 is held in its second position, i.e., out of registry with the stationary lens component 3.

The foot 4b constitutes that member or element of the flash unit 4c which is movable with reference to the housing 1 between an operative position (when it fully enters the space 4a) and an inoperative position in which the unit 4c is at least partially detached from the camera. In response to movement of the foot 4b to its operative position, the motion transmitting mechanism which includes the pin 5 and lever 9 will automatically shift the component 11 into registry with the stationary component 3 so that the camera is set for flash operation. During its movement in a counterclockwise direction, as viewed in FIG. 1, the lever 9 must overcome the bias of the spring 7 which automatically moves the lens component 11 laterally and out of registry with the lens component 3 when the foot 4b is removed from the space 4a so that the user can immediately begin to make exposures in daylight. In other words, the user need not worry about the position of the lens component 11 and about the focal length of the objective because the focal length is changed automatically in response to attachment or detachment of the flash unit 4c.

In accordance with another feature of my invention, the motion transmitting lever 9 is provided with a projection or lug 12 which automatically adjusts the shutter mechanism 2 in such a way that the mechanism 2 will provide an exposure time which is best suited for flash operation when the flash unit 4c is properly attached to the housing 1. In other words, the motion transmitting device 5, 9 of the camera shown in FIG. 1 will automatically change the focal length of the objective and also another exposure value (in the present instance the exposure time) in response to movement of the foot 4b to operative position. A very satisfactory exposure time for flash photography is 1/30 of a second or thereabouts. The shutter mechanism 2 comprises a retard mechanism of known design which includes a movable pin 13, and the pin 13 is engaged and moved by the projection 12 when the lever 9 is rocked in the direction indicated by an arrow b so that the exposure time is selected to be 1/30 of a second or another appropriate value. The lens component 11 will bring about an automatic reduction of focal length as soon as it moves into registry with the stationary component 3. Therefore, the range in which the camera will take sharp pictures with flash is brought closer to the objective.

FIG. 2 illustrates a camera having a housing 15 with a built-in flash unit including a reciprocable reflector 16. This reflector is movable between the solid-line (inoperative) and phantom-line (operative) positions of FIG. 2 so that the camera is ready for flash operation when the reflector 16 takes the position 16'. The objective comprises a stationary lens component 21 and a reciprocable lens component 22 which latter constitutes an auxiliary lens and will reduce the focal length of the objective when it is caused to move upwardly and into registry with the component 21. The motion transmitting device between the reflector 16 and the component 22 comprises a rigid carrier or arm 19 which is reciprocable with the reflector and is provided with an aperture 20 located in front of the stationary component 21 when the reflector is moved to the solid-line inoperative position. However, when the reflector 16 is moved or caused to move to the phantom-line or operative position 16' of FIG. 2, the aperture 20 moves out of registry with the stationary component 21 and is replaced by the component 22 so that the focal length of the objective is reduced.

The reflector 16 is further connected with a toothed rack 17 which meshes with a manually turnable pinion 18 so that the reflector will move up or down in response to rotation of the pinion in the one or other direction. The rack 17 meshes with the setting element 17a of an adjustable shutter mechanism 17b so that the exposure time may be changed into a fully automatic way to 1/30 of a second or to another appropriate exposure value in response to movement of the reflector 16 to its operative position 16'. The parts 17, 18 constitute additional elements of the motion transmitting mechanism which also includes the carrier 19. Thus, here again, the user need not worry about the focal length and/or about the exposure time when the camera is ready for flash photography, and the focal length of the objective is changed in a fully automatic way when the reflector 16 returns to the solid-line position, thus indicating to the user that the camera is ready to make exposures in daylight.

It is clear that the camera of FIG. 2 may be modified by replacing the reciprocable reflector 16 with a reflector which expands to and from an operative position. In such cameras, the motion transmitting connection between the expansible reflector and the lens component 22 must be modified to allow for reciprocation of the carrier 19, or the carrier 19 is replaced by a lever or the like.

Referring finally to FIG. 3, there is shown a still camera which comprises a housing 25 and a built-in flash unit 26 having a socket 26a provided with two contact springs 27, 28 defining between themselves a space 26b which may receive the stem 40a of a flash bulb 40. The numeral 26c denotes the fixed reflector of the flash unit 26. The space 26b between the contact springs 27, 28 normally accommodates a portion of a reciprocable motion transmitting pin 29 which is movable up and down and is automatically expelled from the space 26b in response to insertion of the stem 40a, i.e., when the flash bulb 40 is moved to operative position. When the flash bulb 40 is withdrawn and thus assumes an inoperative position, the pin 29 automatically returns into the space 26b. The lower end of the pin 29 abuts against the shorter arm of a two-armed motion transmitting lever 30 which is rockable on a pivot 31 and whose longer arm supports a lens component 34. The latter is movable into and out of registry with a stationary lens component 35 of fixed focal length. A spring 32 biases the lever 30 in a clockwise direction, as viewed in FIG. 3, so that the lever abuts against a fixed stop 33 and thereby maintains the lens component 34 out of registry with the stationary lens component 35. When the lever 30 assumes the position shown in FIG. 3, its shorter arm holds the upper portion of the pin 29 in the space 26b between the contact springs 27, 28.

The camera of FIG. 3 further comprises an adjustable shutter mechanism 36 including a setting ring 36a which is rotatable about the optical axis and carries an index 37 movable into registry with several graduations on a fixed scale 38. The position of the index 37 and scale 38 may be reversed. The ring 36a also carries a motion transmitting pin 39 which is engaged and moved by the lever 30 in response to insertion of the flash bulb 40 so that the shutter mechanism 36 is adjusted and provides an optimum exposure time for flash operation when the lens component 34 is moved in front of and registers with the stationary lens component 35 to thereby reduce the focal length of the objective. During movement of the pin 39 in response to rocking of the lever 30 in a clockwise direction, the setting ring 36a rotates in the direction indicated by an arrow e. The arrow c indicates the direction in which the stem 40a of the flash bulb 40 is inserted to expel the pin 29 from the space 26b. The arrangement may be such that, in response to insertion of the flash bulb 40, the shutter mechanism 36 is automatically adjusted to provide an exposure time of 1/30 of a second. Of course, if the mechanism 36 is adjusted for such exposure time prior to insertion of the flash bulb 40, the ring 36a will not rotate in response to rocking of the lever 30 against the bias of the spring 32, i.e., in the direction indicated by an arrow d.

When the camera is used for daylight photography, the setting ring 36a is turned by hand.

The pin 29 could be coupled to the lever 30, or the latter could be replaced by a reciprocable carrier similar to the carrier 19 of FIG. 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective in the position of registry with said first component; an illuminating arrangement including a member movable with reference to said housing between operative and inoperative positions; and motion transmitting means for moving said second component with reference to said first component in response to movement of said member with reference to said housing.

2. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective in said second position of registry with said first component; an illuminating arrangement including a member movable with reference to said housing between operative and inoperative positions; and motion transmitting means for moving said second component from said first position to said second position in response to movement of said member from said inoperative position to said operative position so that the second component registers with said first component when the camera is set for operation with artificial illumination.

3. In a camera; a housing including an attachment; an objective mounted in said housing and comprising a plurality of optical lens components each having a predetermined focal length and including a first stationary lens component of fixed focal length and a second component movable into and out of registry with said first component to thereby reduce the focal length of said objective in said position of registry with the first component; an illuminating arrangement having a member engageable with and disengageable from said attachment; and motion transmitting means operated by said member to move said second component into registry with said first component in response to engagement of said member with said attachment.

4. In a camera; a housing; an objective mounted in said housing and comprising a plurality of optical lens components each having a predetermined focal length and including a first stationary lens component of fixed focal length and a second component movable into and out of registry with said first component to thereby reduce the focal length of said objective in the position of registry with said first component; an illuminating arrangement built into said housing and including a member movable between operative and inoperative positions; and motion transmitting means for moving said second component into registry with said first component in response to movement of said member to operative position.

5. In a camera; a housing; an objective mounted in said housing and comprising a plurality of lens components including a first component of fixed focal length and a second component movable into and out of registry with said first component to thereby change the focal length of said objective; and a flash unit built into said housing and including a reflector movable between operative and inoperative positions; and motion transmitting means for moving said second component into registry with said first component in response to movement of said reflector to operative position.

6. In a camera; a housing; an objective mounted in said housing and comprising a plurality of optical lens components each having a predetermined focal length and including a first stationary lens component of fixed focal length and a second component movable into and out of registry with said first component to thereby reduce the focal length of said objective in the position of registry with said first component; an illuminating arrangement built into said housing, said flash unit including a socket arranged to receive a flash bulb so that the illuminating arrangement is ready for operation when the bulb is inserted into said socket; and motion transmitting means for moving said second component into registry with said first component in response to insertion of a bulb into said socket.

7. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective in the position of registry with said first component; a lever rockably mounted in said housing and supportingly connected with said second component; resilient means for biasing said lever to a position corresponding to the second position of said second component; and an illuminating arrangement comprising a member movable with reference to said housing from an inoperative position to an operative position and arranged to thereby rock said lever against the bias of said resilient means so as to move the second component into said first position.

8. In a camera, a housing; an objective mounted in said housing and comprising a plurality of lens components including a first component of fixed focal length and a second component movable between first and second positions into and out of registry with said first component to thereby change the focal length of said objective; a lever rockably mounted in said housing and supportingly connected with said second component; resilient means for biasing said lever to a position corresponding to the second position of said second component; stop means for arresting said lever against the bias of said resilient means in the second position of said second component; and a flash unit comprising a member movable with reference to said housing from an inoperative position to an operative position and arranged to thereby rock said lever against the bias of said resilient means so as to move the second component into said first position.

9. In a camera, a housing; an objective mounted in said housing and comprising a plurality of lens components including a first component of fixed focal length and a second component movable between first and second positions into and out of registry with said first component to thereby change the focal length of said objective; adjustable shutter means arranged to provide a plurality of exposure times including a predetermined exposure time which is best suited for flash operation; a flash unit including a member movable between operative and inoperative positions; and motion transmitting means for moving said second component to said first position in response to movement of said member to operative position so that the camera is set for flash operation when said second component registers with said first component, said motion transmitting means comprising means for adjusting said shutter mechanism to said predetermined exposure time in response to movement of said member to operative position.

10. In a camera, a housing; an objective mounted in said housing and comprising a plurality of lens components including a first component of fixed focal length and a second component; a flash unit built into said housing and including a reflector reciprocable between operative and inoperative positions; and a carrier reciprocable with said reflector and connected with said second component to move said second component into registry with said first component and to thereby change the focal length of said objective in response to movement of said reflector from inoperative to operative position.

11. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective in the position of registry with said first component; a lever rockably mounted in said housing and supportingly connected with said second component; an illuminating arrangement including a socket mounted in said housing and defining a space arranged to accommodate a flash bulb; and a pin reciprocably extending into said space and movable with reference to said housing in response to insertion of a bulb into said socket, said pin being arranged to rock said lever to a position corresponding to the first position of said second component in response to insertion of a bulb into said socket.

12. In a camera, a housing; an objective mounted in said housing and comprising a plurality of lens components including a first component of fixed focal length and a second component; a flash unit built into said housing and including a reflector reciprocable between operative and inoperative positions; and a carrier reciprocable with said reflector and connected with said second component to move said second component into registry with said first component and to thereby change the focal length of said objective in response to movement of said reflector from inoperative to operative position, said carrier having an aperture which registers with said first component in the inoperative position of said reflector.

13. In a camera, a housing; an objective mounted in said housing and comprising a plurality of optical lens components each having a predetermined focal length and including a first stationary lens component of fixed focal length and a second component movable with reference to said first component between first and second positions into and out of registry with said first component to thereby reduce the focal length of said objective in the position of registry with said first component; a lever rockably mounted in said housing and supportingly connected with said second component; a shoe defining a space and mounted on said housing; an illuminating arrangement having a foot removably insertable into the space defined by said shoe; and a motion transmitting element normally extending into said space and movable with reference to said housing to rock said lever to a position corresponding to the first position of said second component in response to insertion of said foot into said space so that said second component registers with said first component when said illuminating arrangement is attached to said housing.

14. A structure as set forth in claim 13, wherein said motion transmitting element is a pin reciprocable into and from said space and further comprising resilient means for biasing the pin into said space.

15. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective to less than said fixed focal length when in registry with said first component; a flash unit including a member movable with reference to said housing between operative and inoperative positions; and motion transmitting means for moving said second component into registry with said first component in response to movement of said member to operative position.

16. In a camera, a housing; an objective mounted in said housing and comprising a plurality of lens components including a first component of fixed focal length and a second component movable into and out of registry with said first component to thereby change the focal length of said objective; a flash unit including a member movable with reference to said housing between operative and inoperative positions; adjustable exposure value selecting means mounted in said housing and arranged to provide a plurality of exposure values including a predetermined value which is best suited for flash photography; and motion transmitting means for moving said second component into registry with said first component in response to movement of said member to operative position, said motion transmitting means comprising means for adjusting said exposure value setting means so as to provide said predetermined exposure value in response to movement of said member to operative position.

17. In a camera, a housing; an objective mounted in said housing and comprising a plurality of optical lens components each having a predetermined focal length and including a first stationary lens component of fixed focal length suited for daylight photography and a second component movable into and out of registry with said first component to thereby change the focal length of said objective in such a way that the focal length is reduced to below said fixed focal length and is suited for operation in artificial light when the two components register with each other; an illuminating arrangement including a member movable with reference to said housing between operative and inoperative positions; and motion transmitting means for moving said second component into registry with said first component in response to movement of said member to operative position.

References Cited

UNITED STATES PATENTS

| | | | |
|---|---|---|---|
| 2,616,342 | 11/1952 | Thompson | 95—11 |
| 3,175,479 | 3/1965 | Beach et al. | 95—11 |
| 3,208,363 | 9/1965 | Easterly et al. | 95—11 |
| 3,220,328 | 11/1965 | Jakob et al. | 95—11.5 |
| 3,259,043 | 7/1966 | Pagel | 95—11.5 |
| 3,318,215 | 5/1967 | Schiks | 95—11.5 |

NORTON ANSHER, *Primary Examiner.*

FRED L. BRAUN, *Assistant Examiner.*